US008811297B2

(12) United States Patent
Coletti et al.

(10) Patent No.: US 8,811,297 B2
(45) Date of Patent: Aug. 19, 2014

(54) METHOD OF CONNECTION BASED SCHEDULING WITH DIFFERENTIATED SERVICE SUPPORT FOR MULTI-HOP WIRELESS NETWORK

(75) Inventors: Luca Coletti, Piave di Cadore (IT); Simone Redana, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1182 days.

(21) Appl. No.: 12/312,122

(22) PCT Filed: Oct. 22, 2007

(86) PCT No.: PCT/EP2007/061290
§ 371 (c)(1),
(2), (4) Date: Jan. 5, 2010

(87) PCT Pub. No.: WO2008/049809
PCT Pub. Date: May 2, 2008

(65) Prior Publication Data
US 2010/0128680 A1 May 27, 2010

(30) Foreign Application Priority Data
Oct. 27, 2006 (EP) .................................... 06425740

(51) Int. Cl.
*H04W 4/00* (2009.01)
*H04L 12/56* (2006.01)
*H04L 12/54* (2013.01)
*H04W 72/12* (2009.01)
*H04W 28/24* (2009.01)
*H04W 84/22* (2009.01)

(52) U.S. Cl.
CPC .......... *H04L 47/2408* (2013.01); *H04W 28/24* (2013.01); *H04L 47/781* (2013.01); *H04L 47/724* (2013.01); *H04L 12/5695* (2013.01); *H04L 47/14* (2013.01); *H04L 47/15* (2013.01); *H04L 47/805* (2013.01); *H04W 84/22* (2013.01); *H04L 47/827* (2013.01); *H04W 72/1205* (2013.01); *H04L 47/824* (2013.01)
USPC ......................... 370/329; 370/337; 455/452.2

(58) Field of Classification Search
USPC ................. 370/329, 336; 455/452.2
See application file for complete search history.

(56) References Cited

U.S. PATENT DOCUMENTS

| | | | |
|---|---|---|---|
| 6,804,251 B1 | 10/2004 | Limb et al. | |
| 2003/0202476 A1 | 10/2003 | Billhartz et al. | |
| 2004/0008619 A1* | 1/2004 | Doshi et al. | 370/217 |
| 2004/0228296 A1* | 11/2004 | Lenzini et al. | 370/322 |
| 2005/0238016 A1* | 10/2005 | Nishibayashi et al. | 370/389 |
| 2006/0079241 A1* | 4/2006 | Faccin et al. | 455/450 |
| 2006/0140119 A1* | 6/2006 | Yeh et al. | 370/235 |
| 2006/0264172 A1* | 11/2006 | Izumikawa et al. | 455/11.1 |
| 2006/0271686 A1* | 11/2006 | Sekaran | 709/227 |
| 2007/0072604 A1* | 3/2007 | Wang | 455/428 |
| 2007/0081507 A1* | 4/2007 | Koo et al. | 370/338 |
| 2007/0097945 A1* | 5/2007 | Wang et al. | 370/349 |
| 2007/0116234 A1* | 5/2007 | Schneider et al. | 379/219 |
| 2007/0206623 A1* | 9/2007 | Tiedemann et al. | 370/431 |
| 2008/0019423 A1* | 1/2008 | Hu | 375/141 |

FOREIGN PATENT DOCUMENTS

| | | | | |
|---|---|---|---|---|
| EP | 1 610 503 A1 | 12/2005 | | |
| EP | 1610503 A1 * | 12/2005 | ............. | H04L 12/56 |

OTHER PUBLICATIONS

Abdulkareem Adinoyi et al., "Definition and assessment of relay based cellular deployment concepts for future radio scenarios considering 1st protocol characteristics" Internet Citation, (online)Jun. 30, 2005, XP002359226Retrieved from the Internet: URL:https://www.ist-winner.org/DeliverableDocuments/D3-4.pdf.

Alavi H S et al.: "A Quality of Service Architecture for IEEE 802.16 Standards" Communications, 2005 Asia-Pacific Conference on Perth, Western Australia Oct. 3-5, 2005, Piscataway, NJ, USA, IEEE, Oct. 3, 2005, pp. 249-253, XP010860780.

Antonio Capone, et al.: "QoS Routing in Multi-hop Wireless Networks: a New Model and Algorithm", Internet Citation, (online) Feb.

12, 2004, XP002309068, Retrieved from the Internet: URL:http://www.tlc-networks.polito.it/QoS-IP2005/program.html.

* cited by examiner

*Primary Examiner* — Brandon Renner
*Assistant Examiner* — Scott M Sciacca
(74) *Attorney, Agent, or Firm* — Staas & Halsey LLP

(57) ABSTRACT

There is disclosed a method of centralized scheduling of the access to a common radio channel in multi-hop wireless networks. The requests by the relay nodes (RN(1,1) ... RN(n,$N_n$), $RN_i$) of resources for sending uplink flows towards the base station (BS), and/or downlink flows towards relay nodes (RN(1,1) ... RN(n,$N_n$), $RN_i$) are computed by a requesting node for all links up to the destination and sent as cumulative requests for all links concerned. In case the traffic for which access to the common channel is demanded relates to different classes of service, each cumulative request includes the concatenation of a plurality of individual cumulative requests each concerning traffic belonging to a different class of service.

7 Claims, 4 Drawing Sheets

METHOD OF CONNECTION BASED SCHEDULING WITH DIFFERENTIATED SERVICE SUPPORT FOR MULTI-HOP WIRELESS NETWORK

CROSS REFERENCE TO RELATED APPLICATIONS

This application U.S. National State of International Application No. PCT/EP2007/061290, filed Oct. 22, 2007 and claims the benefit thereof. The International Application claims the benefits of European Application No. 06125740.5, filed on Oct. 27, 2006, both applications are incorporated by reference herein in their entirety.

BACKGROUND

1. Field

The embodiments discussed herein refer to broadband wireless access networks, and more particularly they concern a connection-based scheduling method with differentiated service support for hierarchical multi-hop relay networks. The embodiments can be used for instance in networks based on IEEE standards 802.16x, which is one of the promising standards where protocol elements are defined, worth of being considered when designing air interfaces for new generation systems, i.e. beyond-3G (3rd Generation) and 4G (4th Generation) systems. In this respect, reference can be made to: IEEE 802.16-2004, IEEE Standard for Local and Metropolitan area networks—Part 16: Air Interface for Fixed Wireless Access Systems, October 2004, and IEEE Std 802.16e-2005, Amendment to IEEE Standard for Local and Metropolitan Area Networks—Part 16: Air Interface for Fixed Broadband Wireless Access Systems—Physical and Medium Access Control Layers for Combined Fixed and Mobile Operation in Licensed Bands, February 2006.

2. Description of the Related Art

The very high data rates envisioned for 4G wireless systems in reasonably large areas do not appear to be feasible with the conventional cellular architecture due to two basic reasons. First, the transmission rates envisioned for 4G systems are two orders of magnitude higher than those of 3G systems, and it is well known that for a given transmit power level, the symbol (and thus bit) energy decreases linearly with the increasing transmission rate. Second, the spectrum that will be released for 4G systems will almost certainly be located well above the 2 GHz band used by the 3G systems. The radio propagation in these bands is significantly more vulnerable to non-line-of-sight conditions, which is the typical mode of operation in today's urban cellular communications.

The brute-force solution to this problem is to significantly increase the density of the base stations, resulting in considerably higher deployment costs, which would only be feasible if the number of subscribers also increased at the same rate. This seems unlikely to happen, the penetration of cellular phones and other mobile terminals already being high in the developed countries. On the other hand, the same number of subscribers will have a much higher demand in transmission rates. Since presumably subscribers would not be willing to pay the same amount per data bit as for voice bits, a drastic increase in the number of base stations does not seem therefore economically justifiable.

However, fundamental enhancements are necessary for the very ambitious throughput and coverage requirements of future systems. Towards this end, in addition to advanced transmission techniques and co-located antenna technologies, some major modifications in the wireless network architecture itself are required. The integration of multi-hop relaying capability, by which an effective distribution and collection of signals to and from the wireless users is entrusted not only to the base station but also to other network elements (relays) is perhaps the most promising architectural upgrade for extending the coverage of conventional (single-hop) wireless networks at reasonable costs. A multi-hop hierarchical relay network is a network where a base station is associated with a plurality of Relay Nodes (RNs), arranged e.g. according to a logical tree structure, and last-hop (or single-hop) connections are provided towards user terminals (UTs) around each relay node. The multi-hop traffic is transmitted between the base station, which is connected to a fixed backbone network, and the relay nodes that are strategically placed. The last-hop traffic takes place between the relay node and a variable number of user terminals.

The multi-hop technology allows enlarging the overall system coverage with low cost infrastructures, since the relay nodes have a simpler structure and therefore are cheaper than base stations. However, the task of ensuring Quality of Service (QoS) requirements (throughput, delay, jitter, etc.) becomes more complex.

A resource request and allocation strategy at the Medium Access Control (MAC) level keeping limited the end-to-end multi-hop delay has been proposed in our co-pending European Patent Application No. 05485475.0, filed on 1 Jul. 2005, entitled "Connection based scheduling method for hierarchical multi-hop wireless networks extended to beyond 3G radio interface". That application represents the closest prior art and claim 1 thereof recites (the parenthetical references to the Figures are omitted):

"Method for controlling the access to a TDMA wireless channel from nodes deployed as either a linear or tree topology network for multihop transmissions in uplink from a requesting node to a centralized node and/or in downlink from the centralized node towards an end node, including the steps of:

issuing network topology information from the centralized to the other nodes;

computing the amount of resources needed on each individual link between adjacent nodes, by the transmitting node on that link;

releasing permissions, also called grants, for the use exclusive of TDMA channel for a given time by the centralized node to each node along uplink and/or downlink multihop path/s, characterized in that said requesting node issues a cumulative request for the resources needed on each link along the end-to-end path."

According to that strategy, the requests of resources for sending uplink flows from relay nodes to the base station and/or downlink flows from base station to relay nodes are computed by each requesting node for the end-to-end connection instead of being computed only for the next link towards the destination. This is just the meaning of "connection based scheduling". This is made possible in networks with tree topology and centralized scheduling where a request of resources is computed on individual links between two adjacent nodes, and the network configuration is generally known to the requesting nodes. In practice, each requesting node issues a cumulative request given by summing up the same request for each link that separates the node from the base station (in uplink) plus each link separating the base station from the destination node (in downlink). The base station, in response to all cumulative requests, grants uplink and/or downlink resources for each link. A grant is intended as an individual permission given to the node for the use exclusive of the common resource (e.g. the TDMA radio channel) for a fraction of time. The cumulative request/grant is made possible, e.g. in IEEE 802.16 networks, by the structure of the centralized control scheduling messages This strategy, together with an order of transmission depending on the topology (in uplink direction the node farthest form the base station transmits first and the node closest to the base station transmits last, and in downlink direction transmission occurs in the reverse order) guarantees that packets wait for being transmitted only in the source relay nodes and not in the forwarding or transit relay nodes, and that they are delivered to the destination within one frame once they are sent from the source node. A further one-frame delay is to be considered in the average for the last hop from/to the user terminal. Also, fairness in respect of the number of hops and of the propagation direction (as shown by the delay curves reported in FIGS. 16 and 17 of the application) is achieved.

However, this strategy does not take into account that a relay node generally handles connections associated with services having different Quality of Service (QoS) requirements, such as, in the simplest case, real time and non-real time services (e.g. to support both multimedia and web browsing applications). A grant of resources determined on the basis of the total traffic of the relay nodes can result ultimately in a risk of lack of resources for real time traffic (or generally traffic with higher QoS requirements), especially for nodes more distant from the base station: this results in turn in a degradation of the QoS, especially in case traffic distribution among real time/non real time services (or, generally, among different classes of service) at the different nodes is non-uniform.

SUMMARY

Thus, it is an aspect of the embodiments to provide a method of connection-based scheduling that can result in a fair grant of resources among the different nodes not only in terms of the overall traffic handled by a node but also in terms of the different services to which the traffic refers. Accordingly this aspect is achieved in that, in the presence of traffic belonging to different classes of service, the cumulative request issued by a source node for the resources needed on each link up to the destination node comprises the concatenation of a plurality of individual cumulative requests each concerning traffic belonging to a different class of service. The method of the embodiments will also be referred to as "connection-based scheduling with differentiated service support.

The grant of resources to a node is advantageously non-differentiated with respect to the different classes of service, since the node knows the distribution of its traffic demands and can suitably share the resources it has been granted. Also the message relevant to the grant of resources reserved to said source node could be concatenated at a transmitting node with the individual requests.

The embodiments start from the following considerations. Considering by way of example an IEEE 802.16 compliant network and assuming that each relay node is assigned a transmission opportunity within each frame (and more particularly within the schedule control sub-frame) for sending request and grant control messages (Mesh Centralized Scheduling—MSH-CSCH—messages), 4 OFDM symbols are assigned to a relay node for the transmission of a MSH-CSCH message. Therefore, assuming the most robust modulation and coding for the control sub-frame, which corresponds to 24 bytes per OFDM symbol (QPSK 1/2), the available resources are equal to 96 bytes. Now, it can be seen that, in the general case of a tree network, the length of the MSH-CSCH message, in bytes, assuming no link updates (see the IEEE Standard) is given by the following equation:

$$OH_{MSH-CSCH} = 4 + \sum_{i=1}^{NumRNs} N^i_{child} \qquad (1)$$

where NumRNs is the number of relay nodes within the multi-hop relay network and $N^i_{child}$ is the number of relay nodes with a distance from the base station one hop higher than the distance between the i-th relay node and the base station.

Relation (1) can be deduced from the MSH-CSCH message structure disclosed in the standard (see Table 82). Reference can also be made to the paper "Performance Analysis of IEEE 802.16a in Mesh Operation Mode", by S. Redana and M. Lott, Proceedings of the 13th IST SUMMIT, Lyon, France, June 2004.

Taking into account that multi-hop networks will generally include a limited amount of strategically located relay nodes, so that NumRNs is a rather small number, the length of a conventional MSH-CSCH message is remarkably lower than the available resources. The resources that are not exploited by the conventional MSH-CSCH message for that relay node are thus exploited, according to the embodiments, for concatenating multiple MSH-CSCH messages, in particular different request messages for resources to be allotted to communications belonging to different classes of service.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
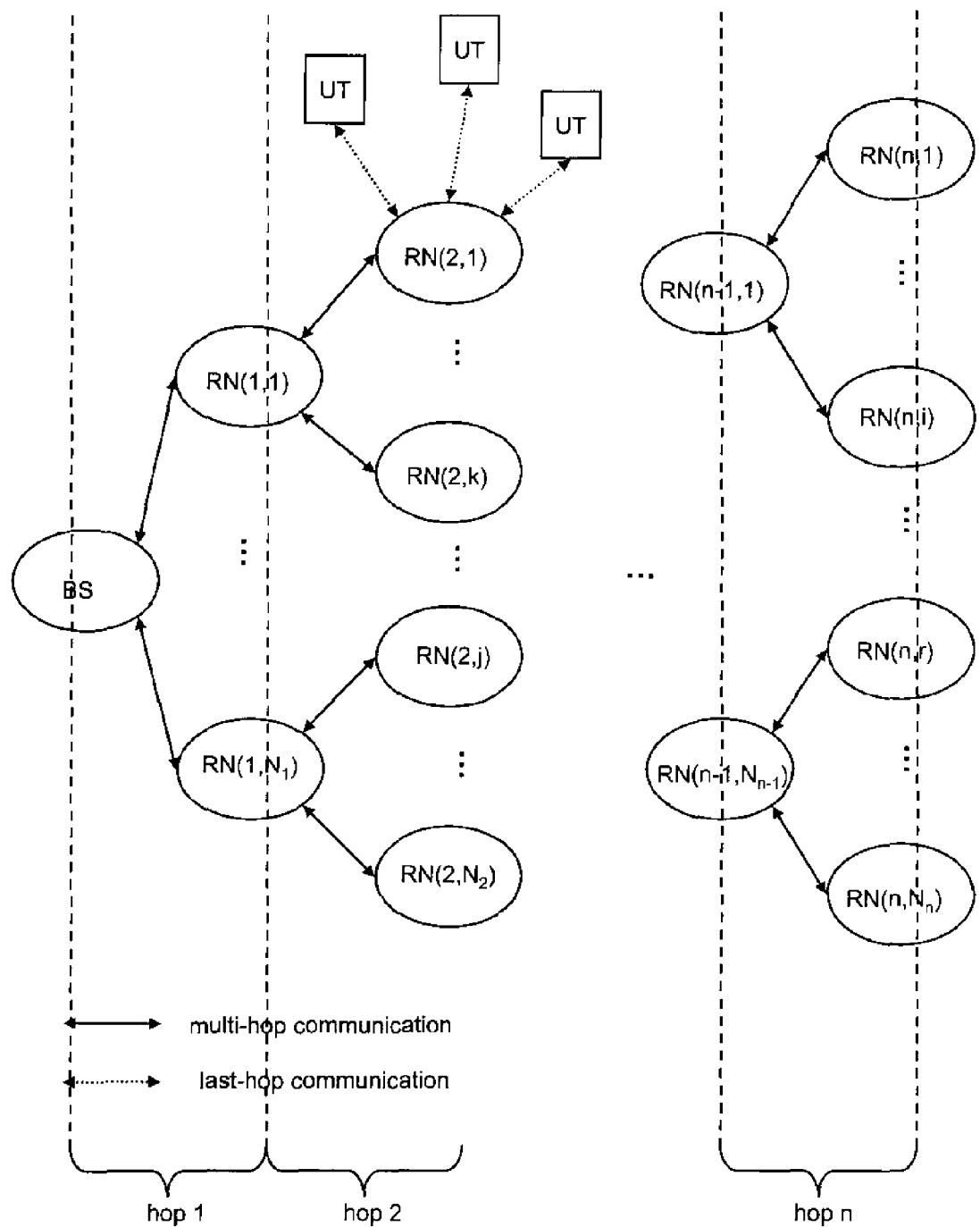
FIG. 1 is a schematic diagram of a multi-hop network.

Reference will now be made in detail to the preferred embodiments, examples of which are illustrated in the accompanying drawings, wherein like reference numerals refer to like elements throughout.

Referring to FIG. 1, there is schematically shown the architecture of a hierarchical multi-hop relay network compliant with IEEE Standard 802.16. The network includes a plurality of relay nodes RN(x,y) that, from a logical point of view, are deployed according to a tree topology, including x=1 . . . n branching levels and y=1 . . . N, nodes per level. Each relay node has wireless access to the adjacent nodes and/or to the base station, depending on its location along the branch. As indicated at the bottom of the Figure, branching level x is x-hop spaced from the base station (BS). A number of user terminals UT are arranged around each relay node, as shown for relay node RN(2,1), and have wireless access thereto. The whole of the relay nodes and the base station forms a mesh structure supporting multi-hop links. A relay node and the user terminals served by that node form a Point-to-Multipoint structure supporting single-hop links. Multi-hop links are shown by solid lines and single hop links are shown by dotted lines in the Figure. We emphasize, however, that the tree configuration is a logical one, and that the physical system is strictly related with the characteristics of the area where the network is deployed and, in general, will result in the provision of a limited number of strategically located relay nodes.

The multiplexing of multi-hop and last-hop air interface can be performed according to different concepts. The standard does not define the solution. The frequency domain discussion is a possible approach. The total frequency band is divided into two sub-bands: the first sub-band is assigned for multi-hop and the second one for last-hop communication, respectively. The Orthogonal Frequency Division Multiple Access (OFDMA) can be adopted to split the available frequency band into two parts. Another approach is multiplexing multi-hop and last-hop air interface in a time domain. We consider a super frame as combination of two frames: a frame assigned to multi-hop traffic and the other to last-hop traffic.

For supporting the present embodiments, the network provides for a centralized, connection-based scheduling. This means on the one hand that each node issues a cumulative request for the end-to-end connection, containing resource requests not only for the next hop but also for each link towards the destination, and, on the other hand, that the base station gathers all cumulative requests and, in response, grants or allocates uplink and/or downlink resources for each link involved in the connection.

Figure 2:
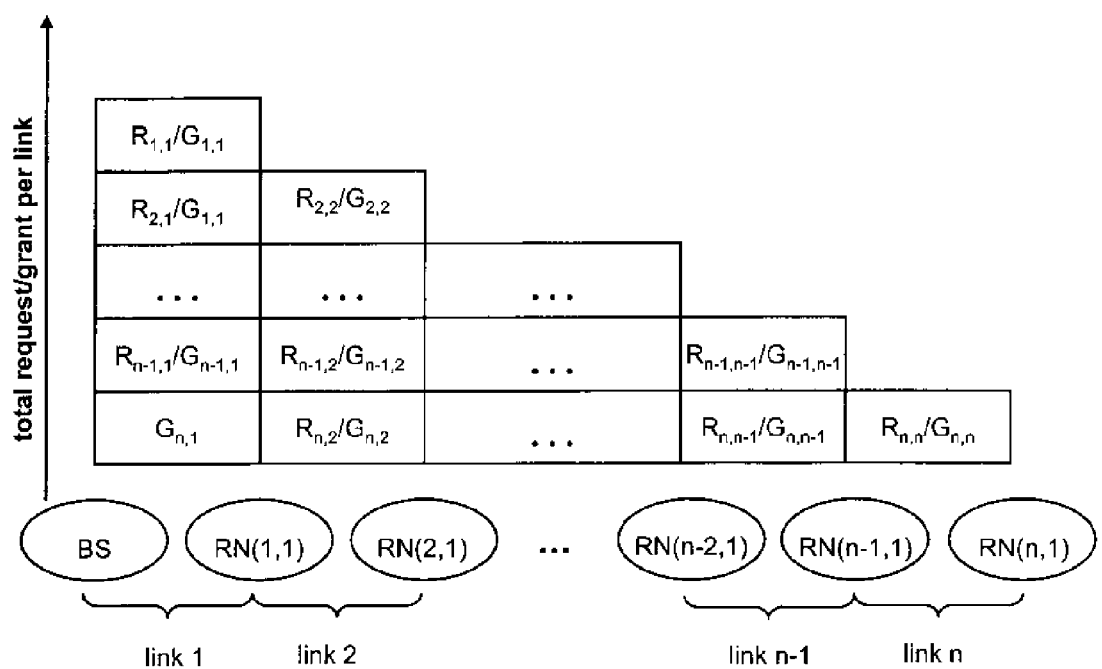
FIG. 2 is a diagram showing the request/grant profile with the connection-based algorithm.

FIG. 2 shows the profile of the requests/grants resulting from the application of the above strategy to a path from BS to node RN(n,1). In the Figure, $R_{i,j}$ and $G_{i,j}$ with i, j=1 . . . n, are the requests and the grants, respectively, on link j for the connection (uplink and/or downlink) between BS and node RN(i,1). FIG. 2 makes it apparent that, due to the centralized management, the "population" of requests/grants on each link increases as the distance from the base station decreases. It is to be borne in mind that the Figure is only qualitative and that, even if the requests/grants are shown by equally sized rectangles whatever the relay node and the link, this does not imply any assumption on the amount of resources actually requested/granted.

Figure 3:
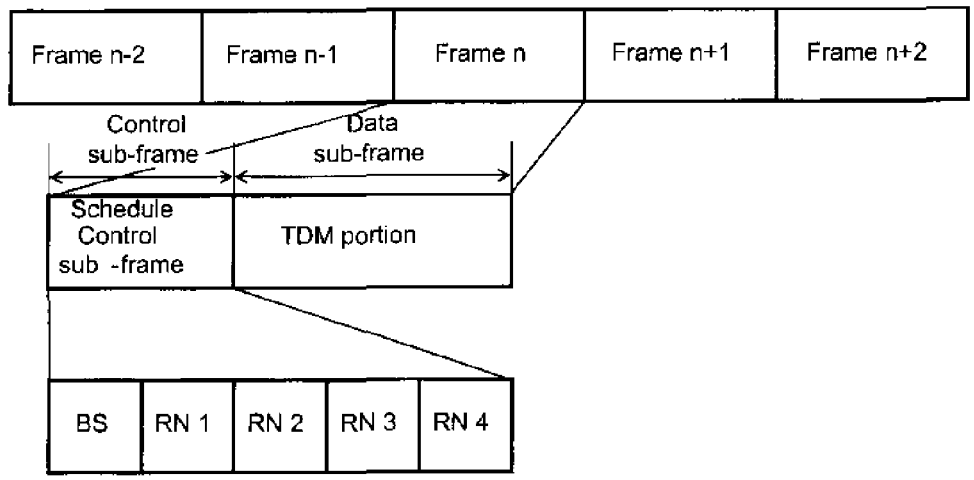
FIG. 3 is a graph of the mesh-frame structure according to standard IEEE 802.16.

FIG. 3 shows the frame organization for the multi-hop operation mode in an IEEE 802.16 compliant network ("mesh operation mode", according to the standard), considering for sake of simplicity and by way of example a branch of the tree structure with four relay nodes denoted here as RN1, RN2, RN3, RN4.

A mesh frame includes of a control sub-frame and a data sub-frame, which are configured by base station BS. According to the standard, two types of control sub-frames exist:
  Network Control sub-frame, used by BS to broadcast network information and by new terminals that want to perform network entry.
  Schedule Control sub-frame, used by BS and the RNs to transmit requests and grants for a new resource allocation within the data sub-frame. Only this second type of control sub-frame is of interest for the embodiments and has been shown in the FIG. 3.
A centralized scheduling is used and hence requests and grants are transmitted by the base station and the relay nodes through MSH-CSCH messages. FIG. 3 further shows that each relay node RN1-RN4 is assigned a transmission opportunity within each frame for sending request and grant control messages. However, this is not mandatory. The standard does not require that resources are assigned to each RN within one control sub-frame: if a transmission opportunity for each relay node is not assumed within one control sub-frame, the transmission order of request and grant messages does not change but it is performed on multiple frames basis. However, since the grant message does not reach each relay node in one frame, data collisions can occur due to non-updated information on resource allocation in each relay node. Measures are to be studied in order to avoid data collisions. The data transmission occurs within the data sub-frame according to the last grant message sent from the base station. Like in the co-pending European patent application, the transmission order depends on the traffic direction (downlink/uplink) and is BS, RN1, RN2, RN3 for downlink traffic and RN4, RN3, RN2, RN1 for uplink traffic. This strategy guarantees that packets wait for being transmitted only in the source relay node and not in the forwarding or transit relay nodes.

The embodiments aim at improving the connection-based scheduling so that the base station, when granting resources to a relay node, can take into account that the traffic handled by that node can relate to different classes of services with different QoS requirements. To attain this goal, it is necessary that:
  each RN is able to classify and assign different classes of service, or equivalently priorities, to different traffic flows (prioritization);
  the BS is able to distinguish between service requests from each RN related to the different classes of service and to establish a priority among the requests it receives (differentiated service). Packet classification is a standard function in the IEEE 802.16 compliant networks considered in the described exemplary embodiment, and thus no problem exists in enabling the relay nodes to perform it.

In order to allow a differentiated service support by the base station, according to the embodiments more than one MSH-CSCH request messages are concatenated in the slot of the scheduling control sub-frame assigned to a given relay node, each request concerning a different class of service.

Figure 4:
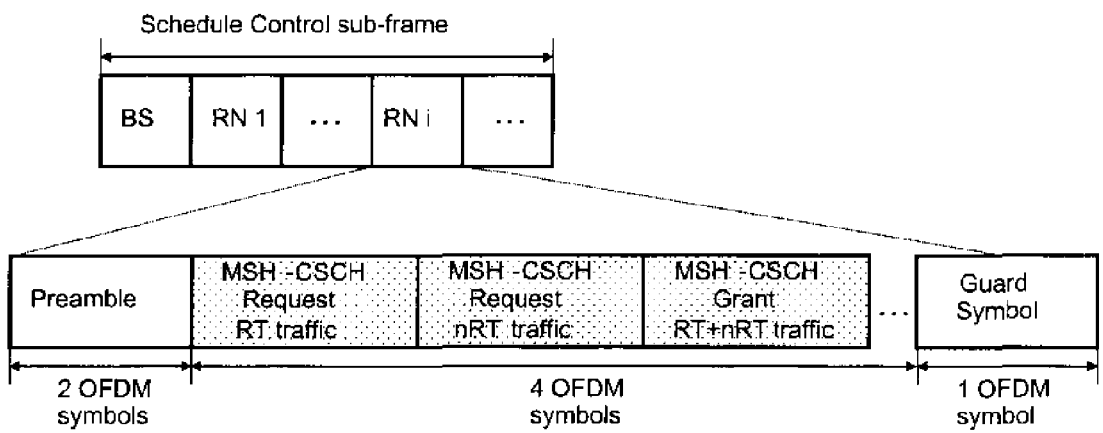
FIG. 4 is a graph showing the structure of the schedule control sub-frame according to the embodiments.

This is shown in FIG. 4 that refers, by way of non-limiting example only, to a coarse classification of the traffic handled by a relay node RNi into "traffic with real-time demands" (RT traffic) and "traffic without real-time demands" (non-real-time, nRT, traffic). This can correspond for instance to distinguishing traffic relating to multimedia and web browsing applications, respectively. In this example, when using the connection-based scheduling with differentiated service support according to the embodiments, the slot of the scheduling control sub-frame may contain the concatenation of an MSH-CSCH request message requesting resources for the RT traffic and an MSH-CSCH request message requesting resources for the nRT traffic. The requests for the different kinds of traffic (referred to hereinafter as individual or partial requests) are still cumulative requests for the resources needed on each link along the end-to-end path.

In case a node is to simultaneously forward both a resource request (in uplink) and a grant (in downlink), also a MSH-CSCH grant message could be concatenated with the individual request messages, since the transmission slot has generally sufficient space to allow so.

Upon receiving the concatenated individual request messages, BS updates its perception of resource needs for the links included in the message and, in the following frame, computes and sends the grant message. Grants are calculated according to a BS-specific policy that is not part of the present embodiments. For instance, considering the RT/nRT example, BS could assign more grants on links where there are higher RT loads with respect to other links with lower RT loads or could allot first resources to real-time traffic and then allot the remaining resources, if any, to non-real traffic.

The actual grant on each link can be calculated, for instance, in the manner disclosed in the above-mentioned patent application: the base station grants resources for each link according to either a profile of grants equal to the profile of the requests for that link if the whole amount of requested resources is below the maximum permissible net throughput for the TDMA channel, or a profile lower than the profile of the requests for that link, if the whole amount of requested resources is not below that maximum permissible net throughput, wherein the lower profile is calculated through a normalization with respect to the ratio between said maximum permissible net throughput and the whole amount of requested resources. Other strategies could result in BS favoring only real time traffic, or favoring the farthest relay nodes, etc.

In any case a grant, as indicated in FIG. 4, is undifferentiated or aggregate, i.e. it concerns the whole traffic handled by the node. Differentiation of the grants according to the service classes is not necessary, since the relay node knows the composition of its requests and can suitably allocate resources to the different service classes without specific instructions from the base station.

Concatenation is made possible, as stated previously, because the planning strategies for multi-hop networks will lead to a limited number of strategically located relay nodes, so that the length of a MSH-CSCH message is much shorter than the length of the slot into which the message is to be inserted, even if the most robust modulation is adopted for transmitting such message.

The only modification requested in the structure of the MSH-CSCH message defined in the standard could be the addition of a "real time/non real time" flag to be set to the proper value when the request/grant flag is 1 (request message). However, that flag is not necessary if the order of concatenation of the requests for the different classes of services is predefined.

Figure 5:
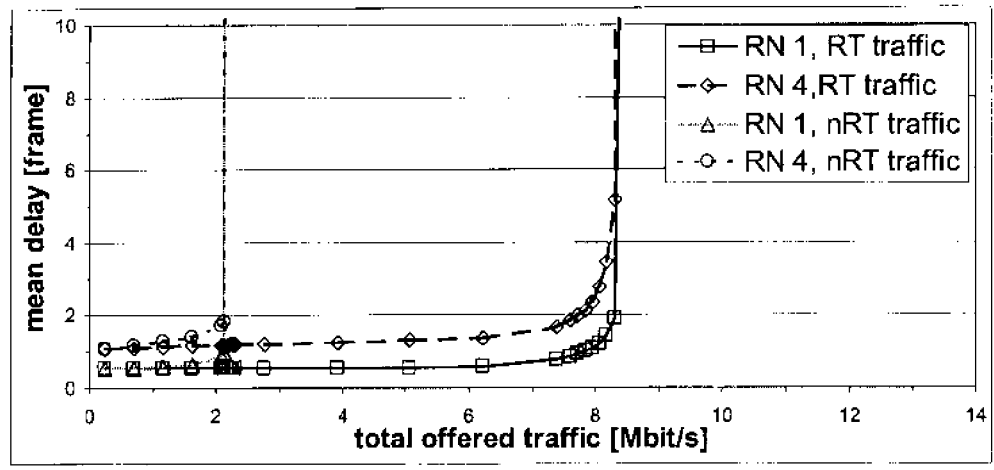
FIG. 5 is a graph of the mean delay versus the total offered throughput in a multi-hop network using the embodiments discussed herein.
Figure 6:
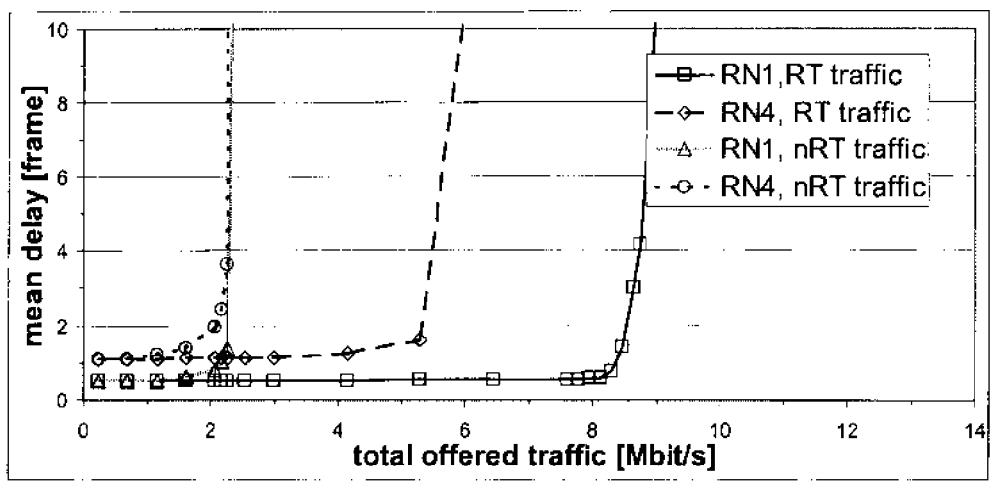
FIG. 6 is a graph of the mean delay versus the total offered throughput in a multi-hop network not using the embodiments discussed herein.

FIGS. 5 and 6 are graphs obtained by simulations carried out on the network with four nodes considered in FIG. 3. The simulations have been performed considering the IEEE 802.16 Point-to-MultiPoint air-interface specifications for the last hop from a relay node to the user terminals. The graphs show the mean delay, expressed in number of frames, vs. the total offered traffic (sum of the traffic to/from a node), assuming a condition in which the aggregate traffic is almost the same at each node whereas different nodes have different ratios of the real time to the non real time traffic. In particular, the load at RN1, RN2, RN3 is composed of 20% real-time traffic and 80% non real-time traffic and the load at RN4 is composed of 40% real-time traffic and 60% non real-time traffic. FIG. 5 is obtained by using the embodiments discussed herein and FIG. 6 without using the embodiments discussed herein.

A comparison of the two graphs makes clearly apparent that, when BS is able to distinguish between real-time and non real-time requests, it can grant a greater amount of radio resources to RN4 than to the other relay nodes, to avoid that RN4 lacks resources for the real time traffic. Thus, a substantial fairness with respect to the number of hops is obtained. On the contrary, if the differentiated service support is not applied, all nodes would be allotted substantially the same resources and the resource allocation would not be fair with respect to number of hops: actually, as shown, the real time traffic aggregated at RN4 is penalized and reaches the saturation point for lower values of offered traffic if compared with the other relay nodes.

Thus, the embodiments further enhance the improvements afforded by the connection-based scheduling in terms of delay, obtaining fairness also among different kinds of connections. Like the general principle of connection-based scheduling, the embodiments can be immediately adopted in IEEE 802.16x networks with a very simple modification, or even no modification, of the structure of the MSH-CSCH messages, as well as in beyond-3G systems with a frame-based physical layer.

It is evident that the above description has been given by way of non-limiting example and that changes and modifications are possible without departing from the scope of the embodiments.

In particular, even if FIG. 4 shows the simple case of two types of traffic flows, more than two request messages can be concatenated, if a finer classification is performed: e.g. as many request messages as are the classes of service supported by the network could be concatenated (for instance, the IEEE standard defines four classes of services). In such case, the "real time/non real time" flag, if provided, will become a more general "class of service" flag. Of course, the maximum number of messages that can be concatenated depends on the number of relay nodes in the network, since the length OHMSH CSCH of each message depends on such number, according to equation (1).

Moreover, even if the embodiments have been disclosed with particular reference to an IEEE 802.16-compliant network, it can be adopted in any generic multi-hop wireless network with the following features:
tree topology with centralized scheduling;
frame-based physical layer, wherein the MAC can align its scheduling intervals with the underlying PHY framing.

The system also includes permanent or removable storage, such as magnetic and optical discs, RAM, ROM, etc. on which the process and data structures of the present embodiments can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method of controlling the access to a common radio channel by nodes in a wireless multihop communication network for multihop traffic from a source node to a destination node wherein the network comprises a plurality of relay nodes and a centralized node managing the access control, the method comprising:
   initiating and issuing, by a relay node having to access the channel, a cumulative request to the centralized node for the resources needed on each link of a multi-hop path up to the destination node, where said relay node is the origin of the cumulative request and where in a presence of traffic belonging to different classes of service, said cumulative request issued by said relay node comprises a concatenation of a plurality of individual cumulative requests each concerning traffic belonging to a different class of service, wherein the centralized node, in response to said plurality of concatenated requests from a relay node, is arranged to generate a single undifferentiated grant message for all classes of service of the individual requests, wherein said single undifferentiated grant message is concatenated with said plurality of individual requests.

2. The method as claimed in claim 1, wherein said individual requests comprise at least an individual cumulative request for real time traffic and an individual cumulative request for non-real time traffic.

3. The method as claimed in claim 1, wherein said cumulative requests comprise an individual cumulative request for each class of service supported by the network.

4. The method as claimed in claim 1, wherein said network is a network with the features of:

tree topology with centralized scheduling; and frame-based physical layer, wherein the medium access control layer can align its scheduling intervals with the framing of the underlying physical layer.

5. The method as claimed in claim 4, wherein said network is a network compliant with the IEEE 802.16x set of standards.

6. The method as claimed in claim 5, wherein said individual requests are sent as mesh centralized scheduling messages including a supplementary flag for distinguishing classes of service to which the individual requests refer.

7. The method as claimed in claim 5, wherein said individual cumulative requests are sent as mesh centralized scheduling messages where individual requests relevant to different classes of service are concatenated in a predetermined and fixed order.

* * * * *

UNITED STATES PATENT AND TRADEMARK OFFICE
CERTIFICATE OF CORRECTION

| | | |
|---|---|---|
| PATENT NO. | : 8,811,297 B2 | Page 1 of 1 |
| APPLICATION NO. | : 12/312122 | |
| DATED | : August 19, 2014 | |
| INVENTOR(S) | : Luca Coletti et al. | |

It is certified that error appears in the above-identified patent and that said Letters Patent is hereby corrected as shown below:

In the Specification

Column 1, Line 12, Delete "06125740.5," and insert -- 06425740.5, --, therefor.

Signed and Sealed this
Eighteenth Day of November, 2014

Michelle K. Lee
*Deputy Director of the United States Patent and Trademark Office*